United States Patent [19]
Hageman

[11] Patent Number: 5,205,010
[45] Date of Patent: Apr. 27, 1993

[54] RETURN-TO-DOCK LEVEL MECHANISM FOR A HYDRAULIC DOCKBOARD

[75] Inventor: Martin P. Hageman, Mequon, Wis.

[73] Assignee: Kelley Company Inc., Milwaukee, Wis.

[21] Appl. No.: 744,312

[22] Filed: Aug. 13, 1991

[51] Int. Cl.$^5$ .......................... E01D 1/00; E01F 1/00
[52] U.S. Cl. ........................................ 14/71.7; 14/31
[58] Field of Search ...................... 14/71.7, 69.5–71.7; 104/31

[56] References Cited

U.S. PATENT DOCUMENTS

| | | | |
|---|---|---|---|
| 3,201,814 | 8/1965 | Le Clear | 14/71.7 |
| 3,290,710 | 12/1966 | Whitenack, Jr. | 14/71.7 |
| 3,388,413 | 6/1968 | Clarke | 14/71.7 |
| 3,656,199 | 4/1972 | Bregantini | 14/71.7 |
| 4,110,860 | 9/1978 | Neff et al. | 14/71.7 |
| 4,343,058 | 8/1982 | Loblick | 14/71.7 |
| 4,365,374 | 12/1982 | Bennett | 14/71.7 |
| 4,641,388 | 1/1987 | Bennett et al. | 14/71.7 |
| 4,955,923 | 9/1990 | Hageman | 14/71.7 |

Primary Examiner—Ramon S. Britts
Assistant Examiner—Nancy P. Connolly
Attorney, Agent, or Firm—Andrus, Sceales, Starke & Sawall

[57] ABSTRACT

A return-to-dock level mechanism for a power operated dockboard. The dockboard comprises a ramp which is hinged at its rear edge to the frame of the dockboard and a lip is hinged to the forward edge of the ramp. A ramp cylinder connects the frame and the ramp and acts to pivot the ramp upwardly between a downwardly extending below dock level position to an upwardly inclined position, while a lip cylinder interconnects the ramp and the lip and acts to pivot the lip from a downwardly handing pendant position to an extended position. The return-to-dock-level mechanism includes a pair of position actuated switches, such as mercury switches, which are connected in an electrical circuit with a timer and the pump of the hydraulic system. One of the switches is mounted on the ramp, while the other switch is mounted on the lip. When the ramp is below dock level with the lip extended, the ramp switch will be closed and the lip switch will be opened. As the lip falls from the extended position to the pendant position after a loading operation is completed, the lip switch will close, which energizes the timer and when the timer times out, the circuit to the pump is completed to operate the pump and supply fluid to the ramp cylinder to raise the ramp. When the ramp is elevated to a position slightly above dock level, the ramp switch will open to stop operation of the pump and the ramp will then descend by gravity to the horizontal cross traffic position.

12 Claims, 2 Drawing Sheets

RETURN-TO-DOCK LEVEL MECHANISM FOR A HYDRAULIC DOCKBOARD

BACKGROUND OF THE INVENTION

In a conventional hydraulically operated dockboard, as disclosed in U.S. Pat. No. 4,641,388, a hydraulic cylinder interconnects the frame and the ramp and a lip cylinder interconnects the ramp and the lip. Extension of the ramp cylinder will pivot the ramp upwardly from a horizontal cross traffic position to an upwardly inclined position, while extension of the lip cylinder will pivot the lip from a downwardly hanging pendant position to an extended position where it forms an extension to the ramp.

If the ramp is at a below dock level position when the truck pulls away from the loading dock, the ramp will remain at this downwardly inclined position unless the hydraulic system is manually activated to extend the ramp cylinder and raise the ramp. After the ramp is elevated to a position slightly above horizontal or dock level, the operation of the pump of the hydraulic system is manually terminated and the ramp will then descend by gravity until the cross traffic legs, which depend from the forward edge of the ramp, engage supports on the frame to maintain the ramp in the horizontal or cross traffic position.

It has been found that occasionally the dock operator may not carry out this procedure to return the ramp to a horizontal or dock level position, with the result that the ramp remains in the downwardly inclined position. With the ramp in this below dock level position, it can provide an obstruction to material handling equipment moving over the dock.

SUMMARY OF THE INVENTION

The invention is directed to a return-to-dock level mechanism for a power operated dockboard, such as a hydraulically operated dockboard, which will automatically return the dockboard to a horizontal position when the lip pivots downwardly and the ramp is at a below dock level position.

The dockboard includes a ramp hinged at its rear edge to the frame or supporting structure of the dockboard, and a lip is hinged to the front edge of the ramp and is movable between a downwardly hanging pendant position and an outwardly extending position where the lip forms an extension to the ramp.

A hydraulic system is employed to raise the ramp and pivot the lip to the extended position. The hydraulic system includes a ramp cylinder which interconnects the supporting structure and ramp and a lip cylinder which interconnects the ramp and the lip. By extending the ramp cylinder, the ramp can be pivoted upwardly from a below dock level position, where the ramp is at a slight angle below horizontal, to an upwardly inclined position, while extending the lip cylinder will pivot the lip between the downwardly handing pendant position and the extended position.

The return-to-dock level mechanism includes a pair of position actuated switches, such as mercury switches, which are connected in electric circuit with a timer and the pump of the hydraulic system.

A first of the switches is mounted on the ramp and will be in open condition when the ramp is at an upwardly inclined position. The second switch is mounted on the lip and is in an open position when the lip is extended and will move to a closed position as the lip falls to a predetermined angle short of its pendant position.

During a loading operation, if the ramp is at a below dock level or downwardly inclined position and the lip is extended and engaged with a truck bed, the ramp switch will be closed while the lip switch will be open. When the truck pulls away from the loading dock after the loading operation is concluded, the lip will fall by gravity toward the pendant position, and as it falls the lip switch will move to the closed position which will energize the timer. After a predetermined period during which the timer times out, the circuit to the pump of the hydraulic system will be completed to energize the pump and supply hydraulic fluid to the ramp cylinder unit to raise the ramp. As the ramp is raised to a position slightly above dock level, the ramp switch will move from the closed to the open position, thereby terminating operation of the pump. The ramp will then slowly fall by gravity to the horizontal position where the cross traffic legs on the forward end of the ramp will engage supports on the frame to maintain the ramp in the horizontal position.

The mechanism of the invention will automatically return the dockboard to a dock level or horizontal position when the lip pivots downwardly and the ramp is at a below dock level position without the need for any manual implementation. This ensures that the ramp will be at the horizontal cross traffic position after the loading operation is complete and eliminates interference with cross traffic movement on the dock by virtue of the ramp being at a below dock level position.

The return-to-dock level mechanism of the invention is of simple and inexpensive construction and can be readily retrofitted to existing dockboards with minimum reconstruction.

The timer enables the mechanism to be utilized with various models of dockboards having lips of different sizes and weights without the necessity of any adjustment of the mechanism.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
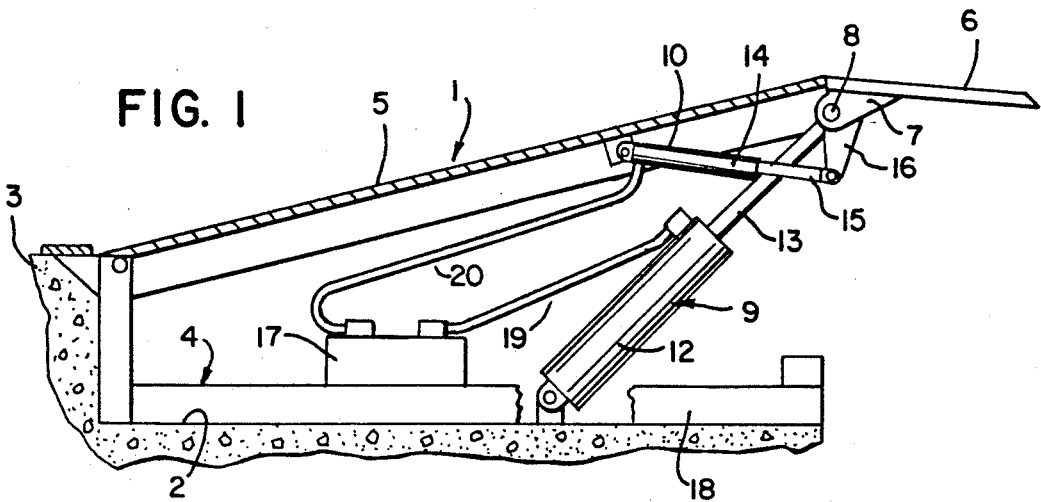
FIG. 1 is a side elevation of a hydraulic dockboard with the ramp in an upwardly inclined position and the lip in the extended position.

FIG. 1 shows a dockboard 1 which is mounted in a pit or depression 2 in a loading dock 3. The dockboard is adapted to bridge the gap between the loading dock and the bed of a truck or carrier which is located in front of the dock.

Dockboard 1 includes a supporting structure or frame 4, and the rear end of a ramp or deckplate 5 is pivoted to the supporting structure, so that the ramp is movable from a generally horizontal cross traffic position, where the ramp is generally flush with the upper surface of dock 3, to an upwardly inclined position, as shown in FIG. 1. In addition, the ramp is capable of moving downwardly to a below dock level position.

Hinged to the forward edge of ramp 5 is a lip 6, which is movable between a downwardly hanging pendant position and an outwardly extending position, as shown in FIG. 1, where the lip forms an extension to the ramp. Lip 6 is hinged to ramp 5 by a series of lugs 7 which are connected to the underside of the lip and are mounted for rotation on a hinge pin 8 which is connected to the forward end of the ramp. The construction of the frame, ramp and lip is conventional and can be of a type as shown in U.S. Pat. No. 4,068,338.

A ramp cylinder unit 9 interconnects frame 4 and ramp 5 and serves to pivot the ramp from the horizontal cross traffic position to the upwardly inclined position, while a lip cylinder unit 10 interconnects the ramp 5 and the lip 6 and serves to move the lip to the extended position.

Ramp cylinder unit 9 includes a cylinder 12 having its lower end pivotally connected to frame 4. A piston rod 13 is slidable in cylinder 12 and the upper end of the piston rod is pivotally connected through suitable lugs to the undersurface of ramp 5.

Lip cylinder unit 10 includes a cylinder 14 having one end pivotally connected to the underside of the ramp, while a piston rod or ram 15 extends from the opposite end of cylinder 14 and is pivotally connected to a lug 16 which is secured to the underside of lip 6.

The hydraulic control system for operating the cylinder units 9 and 10 can be of the type described in U.S. Pat. No. 4,955,923, and the description of that patent is incorporated herein by reference. In general, the hydraulic system includes a fluid reservoir and a pump that are located within a housing 17 mounted on frame 4. Operation of the pump serves to pump hydraulic fluid from the reservoir through line 19 to the upper end of cylinder 9. The piston which is slidable within cylinder 9 is provided with a longitudinal passage which provides communication between opposite sides of the piston. As the lower side of the piston has a larger surface area against which the fluid pressure acts than the upper side, due to the attachment of the piston rod 13 to the upper surface of the piston, the pressure differential will move the piston upwardly to extend the piston rod 13 and elevate the ramp 5 to the inclined position.

When the piston of cylinder 9 reaches the end of its upward stroke and bottoms out, the pressure in the system will increase and the increased pressure is sufficient to unseat a control valve to shift the valve to a position where pressurized fluid is supplied through line 20 to the lip cylinder 10. Applying fluid to the lip cylinder will extend the ram 15 to thereby pivot the lip from the pendant to the extended position.

With the ramp fully elevated, the hydraulic system will then be deactivated and due to the combined weight of ramp 5 and lip 6, the ramp will descend by gravity until the extended lip engages the bed of a truck or carrier parked in front of the loading dock. The rate of ramp descent is controlled by a restrictive orifice in the return line, resulting in the pressure being maintained in the ramp cylinder 9, and the lip cylinder 10 until the descent of the ramp is arrested.

When the extended lip 6 engages the bed of the carrier pressure, in both the lip cylinder 10 and the ramp cylinder 9, will drop to near ambient pressure. This drop in pressure will enable the biasing force to move the control valve back to its original position where the lip cylinder 10 is connected through a return line to the reservoir.

After the loading operation has been completed and the carrier moves away from the dock, lip 6 will pivot downwardly by gravity, forcing the hydraulic fluid from the rear end of the lip cylinder through line 20, and through the control valve to the reservoir. As previously described, the control system is of the type described in U.S. Pat. No. 4,955,923.

The return-to-dock level mechanism of the invention includes a pair of position responsive switches, such as mercury switches, which are connected in an electric circuit with a timer and the pump of the hydraulic system. More specifically, one of the switches 21 is mounted on the undersurface of ramp 5 and switch 21 includes a curved or arcuate vial 22 which contains a movable conductor, such as a mass of mercury 23. A pair of contacts 24 are located in one end of the vial.

A second position responsive switch 25, such as a mercury switch, is mounted on the underside of lip 6 and includes a generally straight vial 26 which is located at an angle of about 45° to the vertical when the lip is in the pendant position. Vial 26 contains a movable conductor, such as a mass of mercury 27, and a pair of electrical contacts 28 are mounted in one end of the vial.

Figure 7:
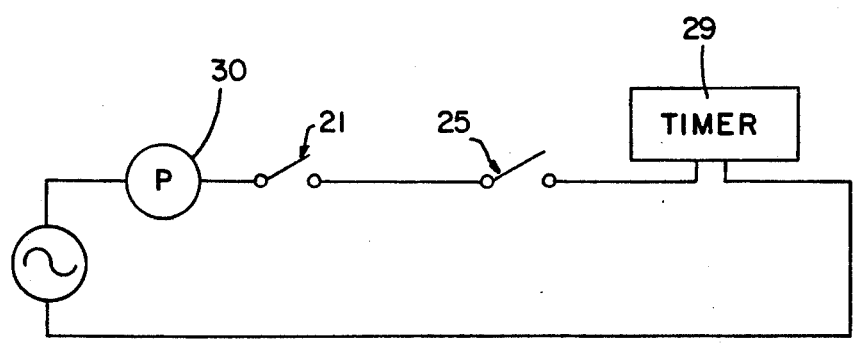
FIG. 7 shows the electric circuit connecting the switches and timer with the pump of the hydraulic system.

As shown in FIG. 7, a timer 29 is connected in series in an electric circuit with switches 21 and 25, pump 30 for the hydraulic system, and a suitable source of electrical power.

Figure 2:
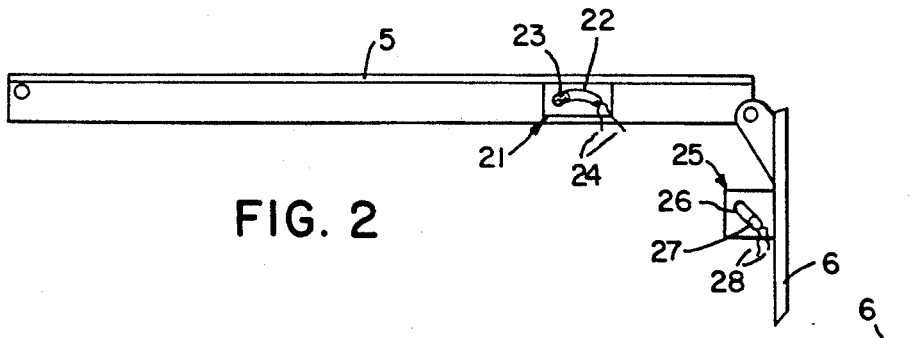
FIG. 2 is a schematic drawing of a dockboard showing the ramp in horizontal position and the lip in the pendant position and showing the position of the two mercury switches.
Figure 3:
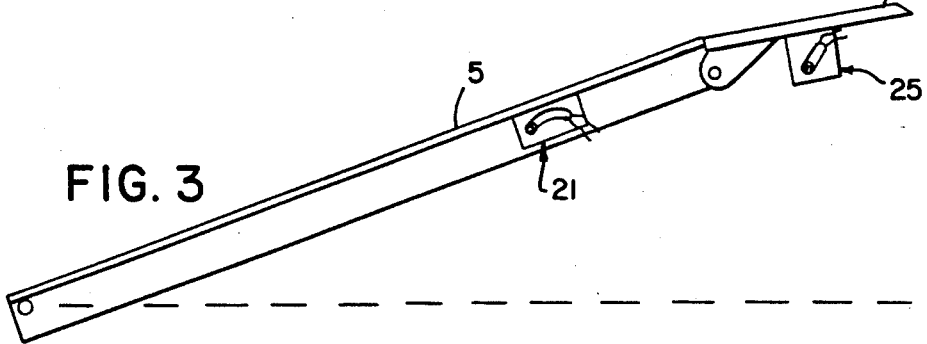
FIG. 3 is a view similar to FIG. 2 showing the ramp in an upwardly inclined position and the lip extended.

When the ramp 5 is at a horizontal position and lip 6 is pendant, as shown in FIG. 2, switch 21 will be open, while switch 25 will be closed. When ramp 5 is pivoted to the upwardly inclined position by operation of cylinder unit 9 and the lip is moved to the extended position by operation of cylinder unit 10, as shown in FIG. 3, switch 21 will remain in the open position, while switch 25 will also move to the open position.

Figure 4:
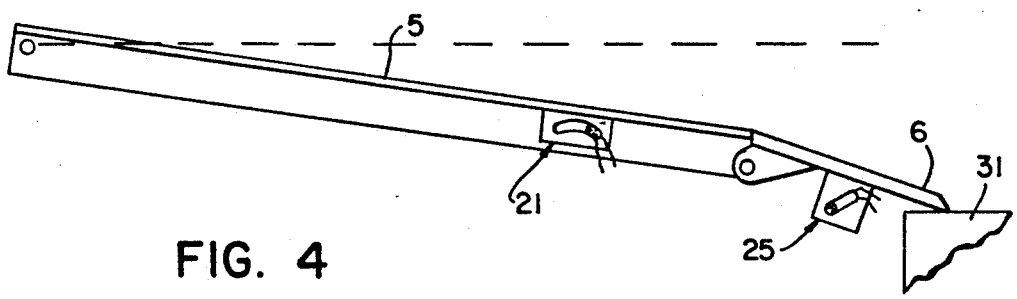
FIG. 4 is a view similar to FIG. 2 showing the ramp in a downwardly inclined, below dock level position with the lip extended and engaged with the bed of a carrier.

If during a loading operation the ramp is at a downwardly inclined or below dock level position, as shown in FIG. 4, and the lip is engaged with the bed of a carrier 31, switch 21 will be in the closed position, while switch 25, due to the fact that the lip 6 is extended, will be in the open position.

Figure 5:
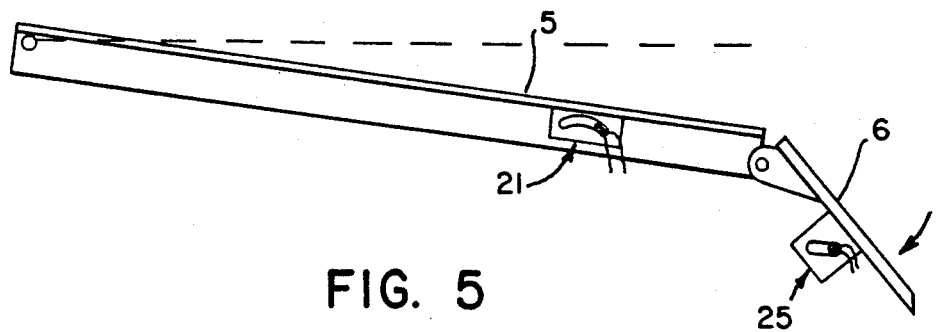
FIG. 5 is a view similar to FIG. 4 showing the lip pivoting to the pendant position as the carrier pulls away from the dock.

When the carrier 31 pulls away from the loading dock, and the lip pivots downwardly to its pendant position, as illustrated in FIG. 5, switch 25 on lip 6 will move to the closed position, thus completing the circuit and energizing the timer 29. In practice, the timer may timeout in a period of about four seconds, which enables the lip to fall to its pendant position before pump 30 is activated. This time delay ensures that the control valve in the hydraulic circuit will be biased back to its original position, where the lip cylinder 10 is connected through line 20 to the reservoir before the pump 29 is operated.

Figure 6:
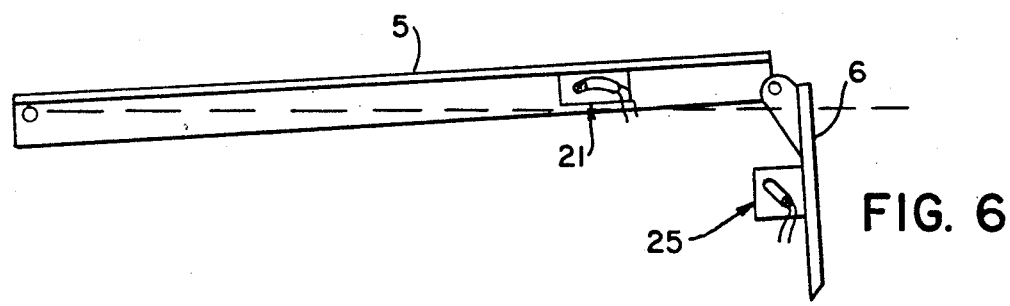
FIG. 6 is a view similar to FIG. 2 showing the ramp being raised from the below dock level position to a position slightly above dock level.

Once the pump begins operation, hydraulic fluid will be supplied to the ramp cylinder unit 9 to pivot the ramp 5 upwardly. As the ramp is moved to an elevation in the range of about 3° to 5° above horizontal, switch 2 will move to the open position, as shown in FIG. 6, to open the circuit and stop operation of the pump. Due to the weight of the ramp and the lip, the ramp will then move downwardly until cross traffic legs (not shown) on the forward end of the ramp engage supports on the frame 4 to hold the ramp in the horizontal or cross traffic position.

The curved or arcuate contour of vial 22 of switch 21 provides an increased range for the switch, so that switch 21 will not close until the ramp is several degrees below horizontal and will not open until the ramp is pivoted several degrees above horizontal.

If timer 29 was not utilized in the system, the fall of the lip through a predetermined angle would immediately begin operation of the pump 30 and if the control valve had not shifted back to its original position, pressurized fluid could be supplied to the lip cylinder 10 to extend the lip. This could cause continual pivoting or "wagging" of the lip between a partially extended and a pendant position. Thus, the use of the timer 29 ensures that the control valve has been shifted, so that the lip cylinder 10 is connected to the reservoir and pressurized fluid will not be immediately supplied to the lip cylinder when the pump is started.

The system of the invention also provides an advantage when an upwardly biased truck restraint is mounted on the front face of loading dock 3 beneath the pit or depression 2. A truck restraint is a device which will engage an ICC bar on the rear end of a truck to prevent the truck from accidentally pulling away from the loading dock while a loading operation is being carried out. Certain types of truck restraints are biased upwardly to a storage position where the truck restraint is located immediately beneath the bottom surface of the pit or depression 2 in the loading dock. If the ramp 5 of the dockboard is at a downwardly inclined or below dock level position when the truck pulls away from the dock, and the lip pivots downwardly, it is possible that the lip will engage the upwardly biased truck restraint which will prevent the lip from moving to its full pendant position. With the system of the invention, after the timer 28 times out, the pump 30 will be energized and the ramp will be elevated, as shown in FIG. 6 to a position slightly above dock level, and as the ramp is elevated, the lip can pivot inwardly to its pendant position without interference with the truck restraint. Thus, the return-to-dock level mechanism of the invention will operate effectively even with docks that include an upwardly biased truck restraint.

The mechanism of the invention automatically returns the dockboard to a horizontal position without operator activity when the lip pivots downwardly and the ramp is at a below dock level position. This ensures that the ramp will be at a horizontal position after the loading operation is concluded and eliminates interference with cross traffic movement on the dock by virtue of the ramp being at a downwardly inclined position.

As a further advantage, the mechanism is of simple and inexpensive construction and can be applied to either new or existing dockboards.

While the return to dock level mechanism, as described above has been associated with a hydraulically operated dockboard, it is contemplated that the mechanism can also be utilized with other types of power operated dockboards.

Various modes of carrying out the invention are contemplated as being within the scope of the following claims particularly pointing out and distinctly claiming the subject matter which is regarded as the invention.

I claim:

1. A dockboard, comprising a supporting structure, a ramp having a rear edge hinged to the supporting structure and movable between a downwardly inclined position to an upwardly inclined position, a lip hinged to a forward edge of the ramp and movable between a downwardly hanging pendant position and an extended position, first operating means for moving the ramp between said downwardly inclined position to said upwardly inclined position, second operating means for moving the lip between the pendant position and the extended position, actuating means responsive to the lip falling from said extended position toward said pendant position when said ramp is at said downwardly inclined position for operating said first operating means to pivot said ramp upwardly, and time delay means operably connected to said actuating means for delaying operation of said actuating means for a predetermined period of time.

2. The dockboard of claim 1, and including means responsive to said ramp being raised from said downwardly inclined position to a position slightly above horizontal level for terminating operation of said actuating means.

3. The dockboard of claim 1, wherein said actuating means comprises an electrical circuit operably connected to said first operating means and including first switch means mounted on said lip and constructed and arranged such that said first switch means is in an open position when the lip is in the extended position and will move to a closed position when said lip falls to a given position intermediate said extended and pendant positions.

4. The dockboard of claim 3, and including second actuating means responsive to said ramp being raised from said downwardly inclined position to a position slightly above horizontal for terminating operation of said first operating means, said second actuating means including second switch means connected to said ramp and connected in said electric circuit, said second switch means being constructed and arranged to move to a closed position when said ramp is at said downwardly inclined position and being constructed and arranged to move to an open position when said ramp is at a position slightly above horizontal.

5. The dockboard of claim 4, wherein said time delay means comprises a timer connected in said electric circuit and constructed and arranged to complete said circuit after said period.

6. A dockboard, comprising a supporting structure mounted on a loading dock, a ramp having a rear end pivoted to the supporting structure and movable between a downwardly inclined position and an upwardly inclined position, a lip hinged to a front edge of the ramp and movable between a downwardly hanging pendant position and an extended position, lip operating means for moving the lip between the pendant and extended positions, ramp operating means for moving said ramp from said downwardly inclined position to said upwardly inclined position, an electric circuit operably connected to said ramp operating means, a first switch mounted on the lip and connected in said circuit, said first switch being constructed and arranged to be open when said lip is at said extended position and to close when said lip falls to a first intermediate position between said extended position and said pendant position, a second switch mounted on said ramp and connected in said circuit, said second switch constructed and arranged to be closed when said ramp is at said downwardly inclined position and to open when said ramp is elevated from said downwardly inclined position to a position slightly above dock level, and time delay means connected in said circuit and constructed and arranged to delay energization of said ramp operating means for a predetermined period of time after both said first and second switches are closed.

7. The dockboard of claim 6, wherein said first and second switches are position actuated.

8. The dockboard of claim 6, wherein said first and second switches each include a closed elongated vial, a pair of electrical contacts disposed in one end of each vial, and a mass of movable electrically conductive material disposed in each vial.

9. The dockboard of claim 8, wherein the vial of said first switch is at an angle to the vertical when said lip is in the pendant position.

10. The dockboard of claim 8, wherein the vial of said second switch is generally arcuate in shape and has a center portion located at a higher level than the end portions of the vial when the ramp is in the horizontal position.

11. A dockboard, comprising a supporting structure mounted on a loading dock, a ramp having a rear end pivoted to the supporting structure and movable between a downwardly inclined position and an upwardly inclined position, a lip hinged to a front edge of the ramp and movable between a downwardly hanging pendant position and an extended position, a hydraulic lip cylinder unit interconnecting the ramp and the lip for moving the lip from the pendant position to the extended position, a hydraulic ramp cylinder unit interconnecting the supporting structure and the ramp for moving the ramp from said downwardly inclined position through a horizontal position to said upwardly inclined position, a hydraulic system operably connected to said lip cylinder unit and to said ramp cylinder unit, and including a pump, an electric circuit connecting said pump to a source of electrical power, a first switch mounted on the lip, said first switch including an elongated closed vial containing a movable mass of mercury, said first switch also including a pair of electrical contacts connected in said electrical circuit and located at one end of said vial, a second switch mounted on said ramp and including a closed generally arcuate vial containing a mass of mercury and having a pair of second electrical contacts disposed in the vial and connected in said circuit, and time delay means connected in said circuit and constructed and arranged to delay the energization of said pump for a predetermined period of time after both said first and second switches are closed, said first switch being constructed and arranged to close when said lip falls from said extended position to an intermediate position short of said pendant position, said second switch being constructed and arranged to close when said ramp is elevated from said downwardly inclined position to a second intermediate position between a horizontal position and said upwardly inclined position.

12. The dockboard of claim 11, wherein said time delay means is constructed and arranged to delay energization of said pump until after said lip falls to the pendant position.

* * * * *